(12) United States Patent
Yamada et al.

(10) Patent No.: US 9,665,193 B2
(45) Date of Patent: May 30, 2017

(54) DISPLAY PANEL AND DISPLAY CONTROL SYSTEM

(71) Applicant: Panasonic Intellectual Property Management Co., Ltd., Osaka (JP)

(72) Inventors: Kazuhiro Yamada, Osaka (JP); Hiroshi Yamaguchi, Osaka (JP); Kazuhiro Morioka, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 45 days.

(21) Appl. No.: 14/964,611

(22) Filed: Dec. 10, 2015

(65) Prior Publication Data

US 2016/0179221 A1   Jun. 23, 2016

(30) Foreign Application Priority Data

Dec. 22, 2014 (JP) .................. 2014-258207
Nov. 11, 2015 (JP) .................. 2015-221189

(51) Int. Cl.
| | |
|---|---|
| *G06F 3/038* | (2013.01) |
| *G06F 3/0354* | (2013.01) |
| *G02B 5/08* | (2006.01) |
| *G02B 5/20* | (2006.01) |
| *G06F 3/03* | (2006.01) |

(52) U.S. Cl.
CPC ......... *G06F 3/0386* (2013.01); *G02B 5/0816* (2013.01); *G02B 5/201* (2013.01); *G02B 5/208* (2013.01); *G06F 3/0321* (2013.01); *G06F 3/03542* (2013.01)

(58) Field of Classification Search
CPC ............ G06F 3/0481; G06F 3/03542; G06F 3/03545; G06F 3/0386; G06F 3/0412; G06F 3/0416; G06F 3/0421
See application file for complete search history.

(56) References Cited

U.S. PATENT DOCUMENTS

| | | | |
|---|---|---|---|
| 2006/0192766 A1* | 8/2006 | Nakamura ............ | G06F 3/0421 345/173 |
| 2011/0148757 A1* | 6/2011 | Lathrop ................ | G06F 3/0386 345/157 |

(Continued)

FOREIGN PATENT DOCUMENTS

WO     2013/161262     10/2013

*Primary Examiner* — Gerald Johnson
(74) *Attorney, Agent, or Firm* — Wenderoth, Lind & Ponack, L.L.P.

(57) ABSTRACT

A display panel according to the present disclosure is a display panel with which an optical pen can be used. The display panel includes: a position information pattern layer which causes the optical pen to identify a position on the display panel; a color filter layer including a color filter partitioned by a lattice structure; and a non-visible light reflection layer having a shape which diffuses and reflects a part of a non-visible light emitted from the optical pen. The non-visible light reflection layer is disposed between the position information pattern layer and the color filter layer, and an amount of light which is reflected by the non-visible light reflection layer and then enters the optical pen is larger than an amount of light which enters the optical pen through the non-visible light reflection layer after being transmitted through the color filter layer and then reflected.

5 Claims, 11 Drawing Sheets

(56) References Cited

U.S. PATENT DOCUMENTS

2013/0321351 A1* 12/2013 Paul .................. G06F 3/0317
                                                  345/179
2013/0334441 A1* 12/2013 Croft ................. G02B 5/208
                                                  250/458.1
2014/0035880 A1   2/2014 Yamada et al.
2014/0292722 A1* 10/2014 Hong ................. G06F 3/042
                                                  345/175

* cited by examiner

DISPLAY PANEL AND DISPLAY CONTROL SYSTEM

BACKGROUND

1. Technical Field

The present disclosure relates to a display panel capable of constituting a display control system together with a reading device, and relates to a display control system.

2. Description of the Related Art

For example, there is known a technique in which a pen type reading device is used to read a position information pattern representing a coordinate position on a plane of a display as described in WO2013/161262 A1. The reading device emits non-visible light, then receives the non-visible light reflected by the display, and identifies, based on the received non-visible light, the coordinate position pointed on the display.

SUMMARY

A display panel according to the present disclosure is a display panel with which an optical pen can be used, the optical pen being configured to emit non-visible light and receive the non-visible light having been reflected. The display panel includes: a position information pattern layer which causes the optical pen to identify a position on the display panel; a color filter layer including a color filter partitioned by a lattice structure; and a non-visible light reflection layer having a shape which diffuses and reflects a part of the non-visible light emitted from the optical pen. The non-visible light reflection layer is disposed between the position information pattern layer and the color filter layer, and an amount of light which is reflected by the non-visible light reflection layer and then enters the optical pen is larger than an amount of light which enters the optical pen through the non-visible light reflection layer after being transmitted through the color filter layer and then reflected.

Further, a display control system according to the present disclosure includes an optical pen and a display panel. The optical pen includes: an emission part which emits non-visible light; a light receiver which receives non-visible light; and a coordinate identification unit which identifies information of a position pointed on the display panel by the optical pen, based on the non-visible light received by the light receiver. The display panel includes: a position information pattern layer having a pattern for allowing the optical pen to identify a position on the display panel; a color filter layer including a color filter partitioned by a lattice structure; and a non-visible light reflection layer having a shape which diffuses and reflects at least a part of the non-visible light emitted from the optical pen. The non-visible light reflection layer is disposed between the position information pattern layer and the color filter layer, and an amount of light which is reflected by the non-visible light reflection layer and then enters the optical pen is larger than an amount of light which enters the optical pen through the non-visible light reflection layer after being transmitted through the color filter layer and then reflected.

DETAILED DESCRIPTION

In the following, an exemplary embodiment will be described in detail with reference to the drawings as appropriate. However, the exemplary embodiments will not be described in detail in some cases. For example, in some cases, already well-known matters will not be described in detail, and substantially identical configurations will not be described again. This is to avoid the following description from being unnecessarily redundant and thus to help those skilled in the art to easily understand the description.

Note that the inventors provide the accompanying drawings and the following description to help those skilled in the art to fully understand the present disclosure, but do not intend to use the drawings or description to limit the subject matters of the claims.

FIRST EXEMPLARY EMBODIMENT

Figure 1:
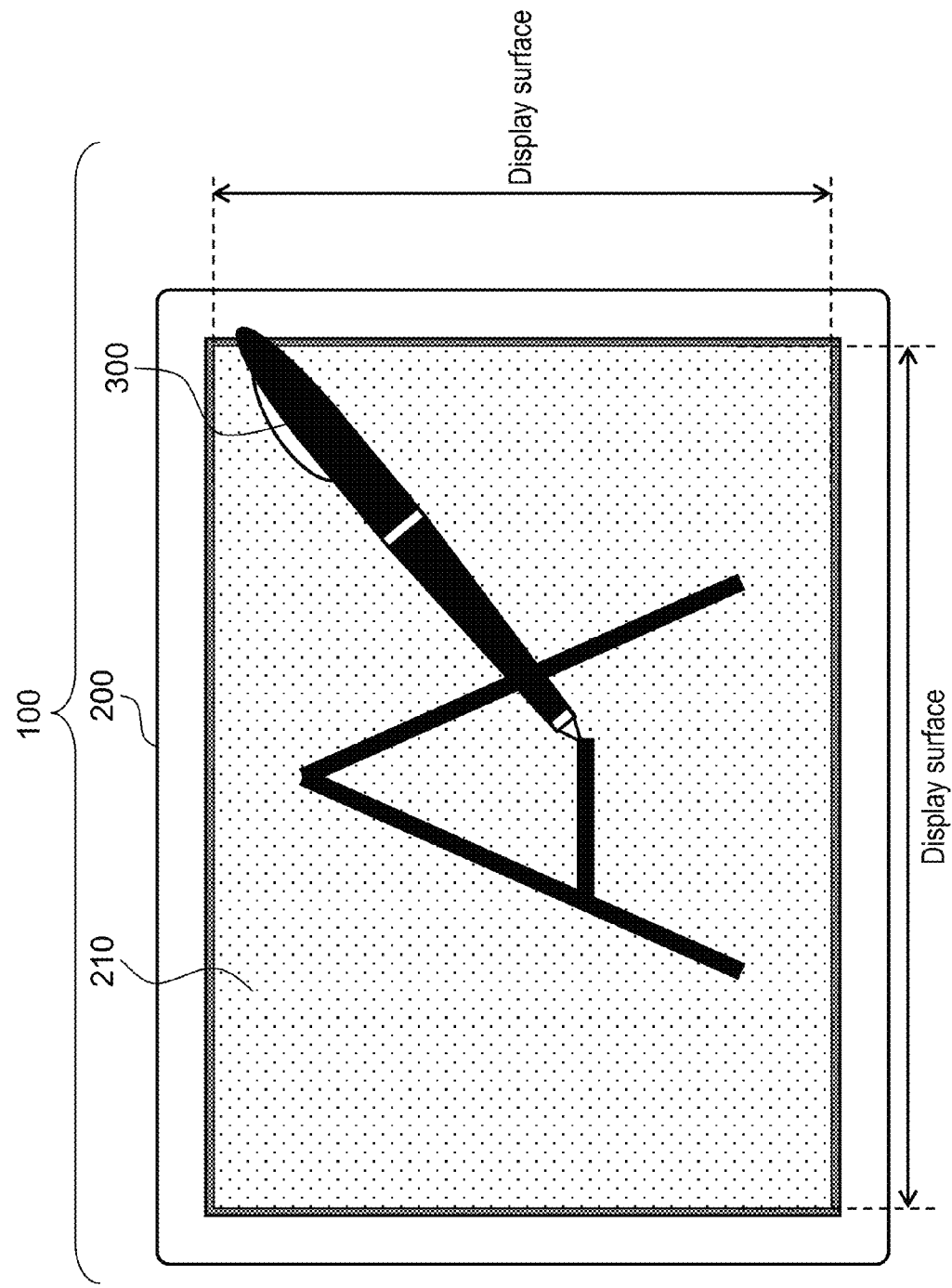
FIG. 1 is an image diagram showing an outer appearance of a display control system.

FIG. 1 is an image diagram showing an outer appearance of a display control system according to a first exemplary embodiment. Display control system 100 includes display 200 and optical digital pen (hereinafter, simply referred to as a "digital pen") 300. Display 200 includes display panel 210. On a surface of display panel 210, a display surface capable of displaying an image or the like is defined. p On the display surface of display panel 210, there are provided dot patterns in a predetermined rule for representing information about a position on display panel 210. A specific example of the dot pattern is described in, for example, U.S. Pat. No. 8,534,566. Digital pen 300 can detect, by optically reading the dot pattern at a position of a tip of the pen, the information about a position (hereinafter, also referred to as "position information") which is on display panel 210 and on which the tip of digital pen 300 is located. Display 200 and digital pen 300 wirelessly communicate with each other, and digital pen 300 sends the detected position information to display 200. With this arrangement, display 200 can obtain the position information representing the position of the pen tip of digital pen 300 and can perform various display controls.

For example, assume a case where the tip of digital pen 300 is moved on display panel 210. At this time, digital pen 300 detects, from the dot patterns having been continuously read, continuous position information as a path of the tip of digital pen 300. Digital pen 300 sequentially sends the detected position information to display 200. With this arrangement, display 200 can continuously display dots on display panel 210, depending on the path of the tip of digital pen 300. With this arrangement, a user can input characters, figures, or the like in handwriting on display panel 210 with digital pen 300.

[1. Configuration of Display Control System 100]

Figure 2:
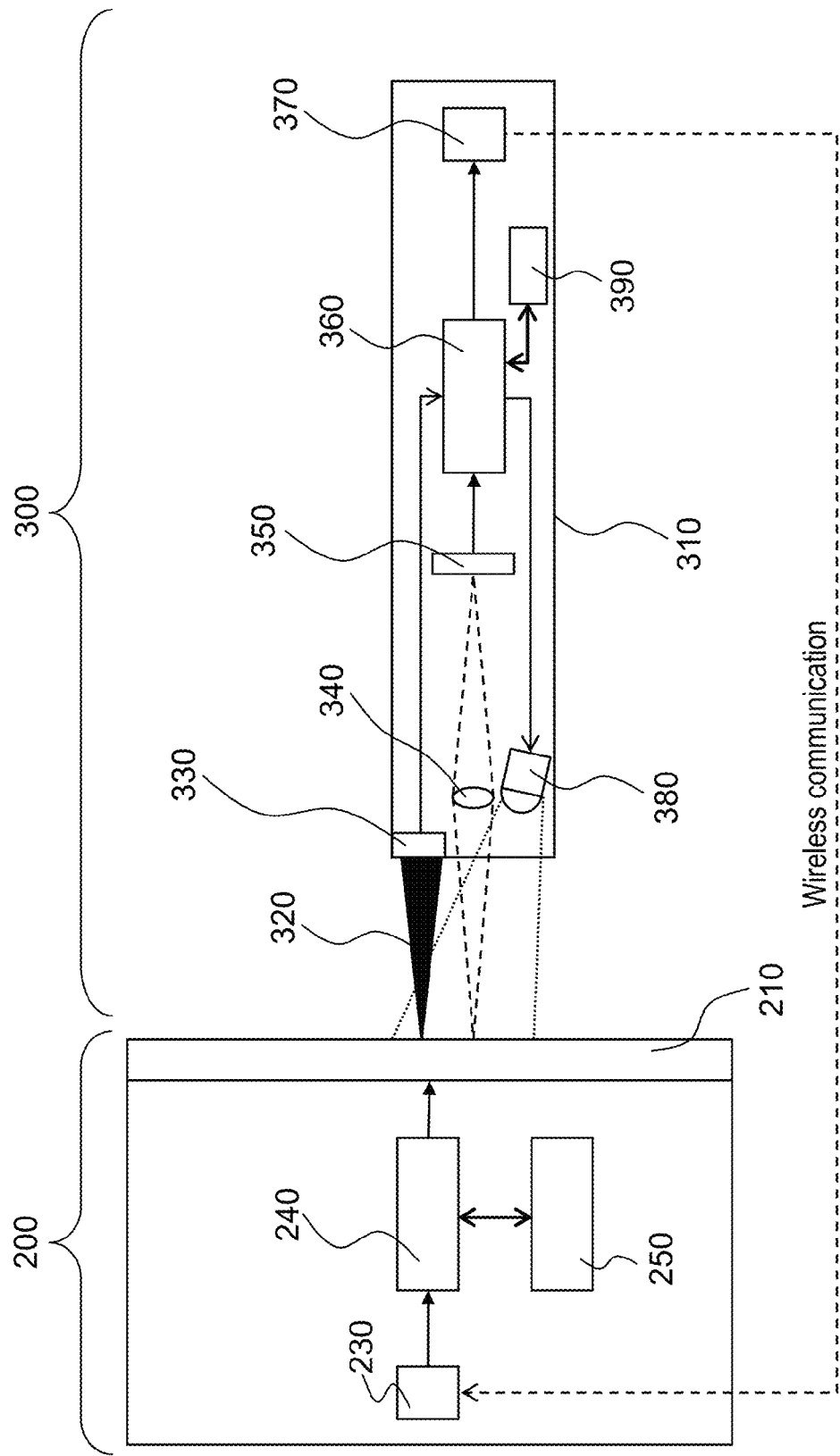
FIG. 2 is a block diagram showing a configuration of the display control system.

In the following, a configuration of display control system 100 will be described. FIG. 2 is a block diagram of the configuration of the display control system.

Display 200 has display panel 210, receiver 230, display side microcomputer 240, and display side memory 250. Although display 200 may have other electrical components, those components will not be described.

Receiver 230 receives a signal sent from digital pen 300. Receiver 230 sends the received signal to display side microcomputer 240.

Display side microcomputer 240 is configured by a CPU, a memory, and the like. Display side microcomputer 240 controls contents to be displayed on display panel 210, based on the signal sent from digital pen 300.

Display side memory 250 stores a program for causing the CPU of display side microcomputer 240 to operate. Display side microcomputer 240 appropriately reads or writes information from or in display side memory 250.

Figure 3:
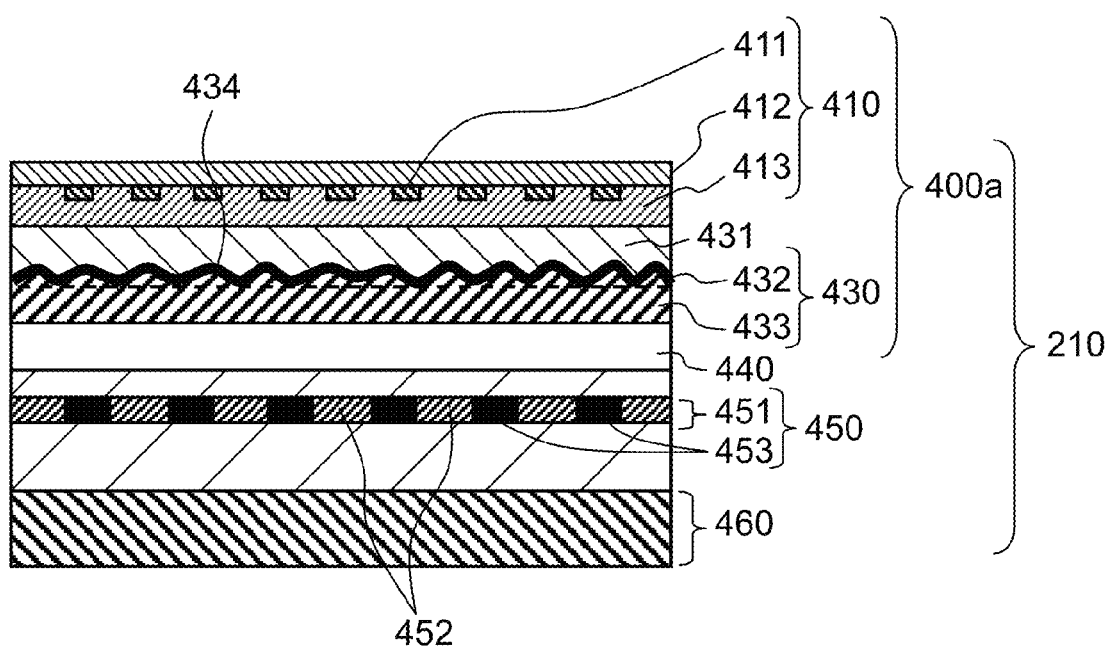
FIG. 3 is a sectional view of a display panel according to a first exemplary embodiment.
Figure 4A:
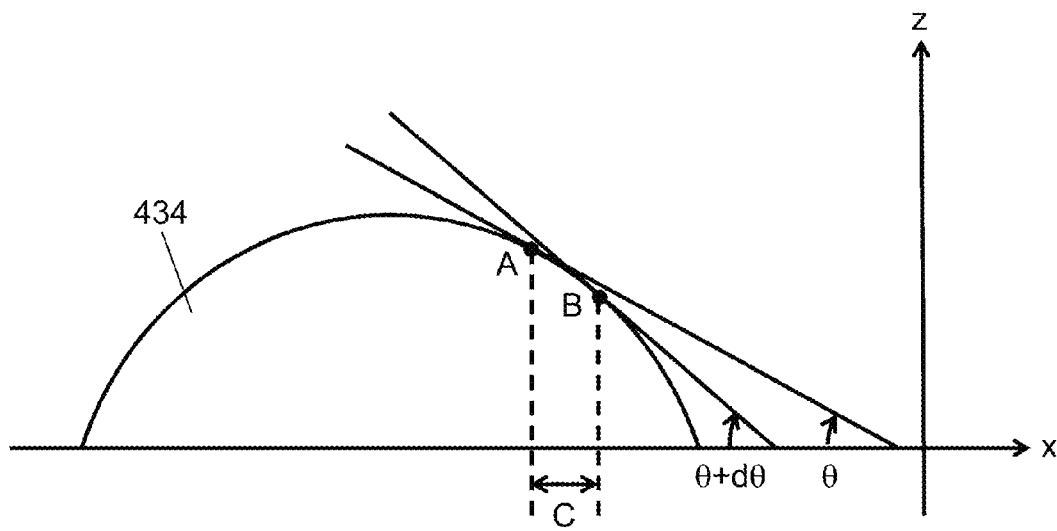
FIG. 4A is a schematic diagram for illustrating a shape of a protrusion.
Figure 4B:
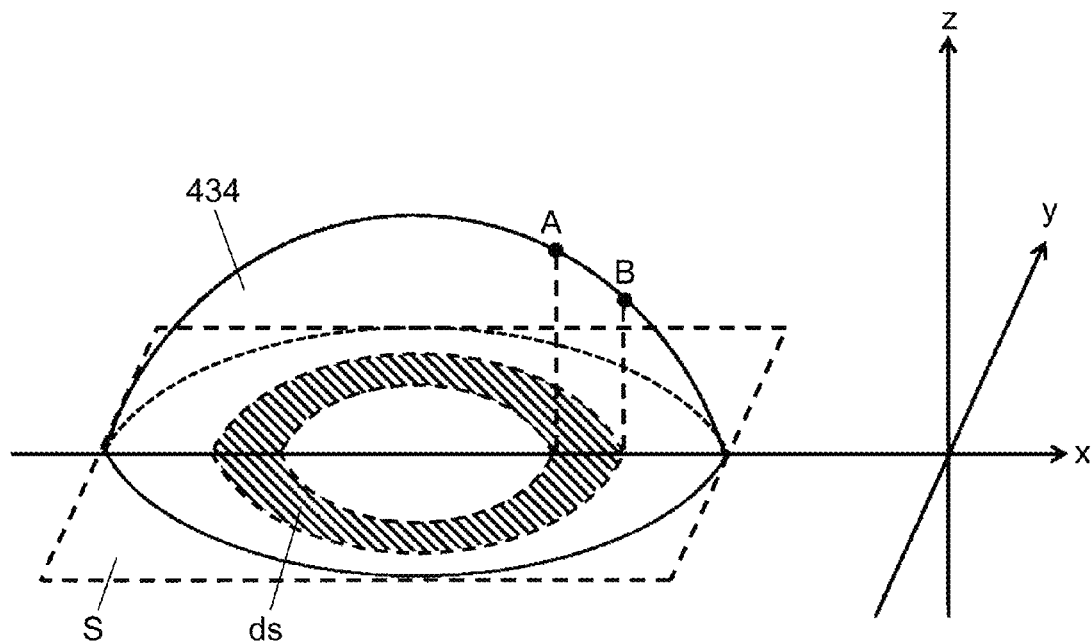
FIG. 4B is a schematic diagram for illustrating the shape of the protrusion.

Next, a configuration of display panel 210 will be described in detail. FIG. 3 is a sectional view of display panel 210 according to the first exemplary embodiment, and FIG. 4A and FIG. 4B are schematic diagrams for illustrating a shape of protrusion 434 to be described later.

As shown in FIG. 3, display panel 210 has optical film 400a, touch sensor glass 440, liquid crystal panel 450, and backlight device 460.

Optical film 400a is configured by laminating dot pattern sheet 410 and infrared reflection sheet 430. Dot pattern sheet 410 has PET (polyethylene terephthalate) film 412 as a substrate, dot patterns made up of a plurality of dots 411, and dot planarization layer 413.

PET film 412 protects a surface of display panel 210 and functions as a substrate on which layers such as dots 411 are stacked.

On a rear surface (the lower surface in FIG. 3) of PET film 412, the plurality of dots 411 are stacked. Each of dots 411 protrudes from the rear surface of PET film 412 by a thickness of dot 411. Then, a group of dots 411 in unit area 213, which will be described later in detail, form a dot pattern. Dots 411 are made of material (material having a low transmittance for infrared light) which transmits visible light but absorbs infrared light.

Dot planarization layer 413 is stacked on the rear surface of PET film 412 so as to fill the spaces between dots 411. In other words, dot planarization layer 413 is formed to cover the rear surface of PET film 412 and the surface of dots 411. Dot planarization layer 413 is formed to cover the entire rear surface of PET film 412. Further, a rear surface of dot planarization layer 413 is a flat surface. Dot planarization layer 413 is made of material that transmits both visible light and infrared light. Dot planarization layer 413 is made of, for example, acrylic resin. Further, dot planarization layer 413 has the same refractive index as dots 411.

As shown in FIG. 3, infrared reflection sheet 430 is configured by: concavo-convex substrate 433 in which concavo-convex is formed of a plurality of protrusions 434; and infrared reflection layer 432 formed along protrusions 434 of concavo-convex substrate 433. These protrusions 434 are formed of specified fine concavo-convex shapes to increase infrared reflection performance.

Specifically, with respect to protrusion 434, as shown in FIG. 4A, when an absolute inclination angle θ is an angle (<90°) formed by a reference surface (the x-axis in FIG. 4A) and a tangential line of protrusion 434, a distribution rate f(θ=25°) when an absolute inclination angle θ of protrusion 434 is 25° is not less than 0.5(%/°), and a proportion of a projected area of an area in which the absolute inclination angle θ of protrusions 434 is not less than 40° is not more than 20% with respect to an effective total area of infrared reflection sheet 430. Here, the distribution rate f(θ) is expressed by the following equation (1).

$$\text{Distribution rate } f(\theta) = (ds/S)/d\theta \qquad (1)$$

In the equation (1), S represents an effective total area of each of protrusions 434. The effective total area is an area for one protrusion 434 of the whole area of infrared reflection sheet 430. In other words, S shown in FIG. 4B represents the effective total area.

Further, dθ represents a minute angle in the vicinity of the absolute inclination angle θ.

In addition, ds represents a projected area of an area in which the absolute inclination angle of protrusions 434 is in a range of θ to θ+dθ in the effective area. Specifically, with respect to FIG. 4A, A is a tangent point of the tangential line having the absolute inclination angle θ and protrusion 434, B is the tangent point of the tangential line having the absolute inclination angle θ+dθ and protrusion 434, and C is the area defined by projecting tangent points A and B on the reference surface. At this time, a set of areas C are defined along the entire circumference of protrusion 434 in the same manner as described above to form the shaded area in FIG. 4B, and this shaded area is projected area ds.

Satisfying the above conditions allows infrared reflection sheet 430 to have infrared ray diffuse-reflection characteristics. Thus, infrared light emitted from illuminator 380 embedded in digital pen 300 is diffused and reflected by infrared reflection sheet 430, and the reflected infrared light is made to enter image sensor 350 embedded in digital pen 300.

Infrared reflection layer 432 reflects (for example, reflects 50% of) an infrared ray, and at the same time transmits (for example, transmits 90% of) visible light. When viewed microscopically, infrared reflection layer 432 specularly reflects an infrared ray. On the other hand, when viewed macroscopically, infrared reflection sheet 430 has infrared reflection layer 432 formed along protrusions 434, and thus functions as an infrared diffuse-reflection member that diffuse and reflect an infrared ray.

Transparent adhesive layer 431 is a layer for bonding dot pattern sheet 410 and infrared reflection sheet 430. Transparent adhesive layer 431 has the same refractive index as materials of PET film 412, dot planarization layer 413, and concavo-convex substrate 433. The surface on dot pattern sheet 410 side of infrared reflection sheet 430 has the concavo-convex shape formed by protrusions 434. Therefore, transparent adhesive layer 431 bonding dot pattern sheet 410 and infrared reflection sheet 430 planarizes the concavo-convex shape and thus fills the spaces, thereby optically coupling dot pattern sheet 410 and infrared reflection sheet 430. In the above description, dot planarization layer 413 and transparent adhesive layer 431 are described to be separate layers; however, the present disclosure is not limited thereto. Specifically, dot planarization layer 413 may also function as transparent adhesive layer 431.

Touch sensor glass 440 is a glass having a sensor which detects a touch operation, of a user, on display panel 210 by a known technique. Touch sensor glass 440 is disposed on a rear surface (lower surface in FIG. 3) of infrared reflection sheet 430.

Liquid crystal panel 450 is a device to display an image by controlling alignment of liquid crystal molecules, based on illumination of visible light, using backlight device 460 as a light source. Liquid crystal panel 450 has color filter layer 451 including black matrix 453, a liquid crystal layer, and the like. Black matrix 453 forms a lattice structure (pixel structure) partitioning color filter 452, for example, for each of RGB. On the rear surface of liquid crystal panel 450, backlight device 460 that radiates light to liquid crystal panel 450 is disposed. A voltage for changing the alignment of liquid crystal of the liquid crystal layer is applied to liquid crystal panel 450, based on display control by display side microcomputer 240. With this arrangement, liquid crystal panel 450 controls an amount of light transmitted from backlight device 460 to perform various types of display operations. Liquid crystal panel 450 is disposed on a rear surface (lower surface in FIG. 3) of touch sensor glass 440.

The above arrangement allows a part of infrared light emitted from illuminator 380 embedded in digital pen 300 to be diffused and reflected by infrared reflection sheet 430 and allows the reflected infrared light to enter image sensor 350 embedded in digital pen 300; thus, dot pattern sheet 410 can be read regardless of an angle of digital pen 300.

In addition, a part of the reflected light transmitted through infrared reflection sheet 430 and color filter layer 451 and then returned to digital pen 300, that is, a part of the reflected light reflected by backlight device 460 and the like and then returned to infrared reflection sheet 430 is transmitted, but the other part is diffused and reflected. As a result, the amount of the reflected light which is reflected by color filter layer 451 and then returns to digital pen 300 is small.

That is to say, the amount of the light which is reflected by infrared reflection sheet 430 and then enters digital pen 300 is larger than the amount of light which enters digital pen 300 through infrared reflection sheet 430 after being transmitted through color filter layer 451 and then reflected.

Next, with reference to FIG. 2, a detailed configuration of digital pen 300 will be described.

Digital pen 300 includes main body case 310 having a cylindrical shape, and pen tip part 320 attached to a tip of main body case 310. Further, digital pen 300 has, in main body case 310, pressure sensor 330, objective lens 340, image sensor 350, pen side microcomputer 360, pen side memory 390, transmission unit 370, and illuminator 380.

Main body case 310 has an outer shape similar to a shape of a common pen and is formed in a cylindrical shape. Pen tip part 320 is formed in a tapered shape. A tip of pen tip part 320 is rounded to an extent not to scratch the surface of display panel 210. Note that it is preferable that pen tip part 320 has such a shape that a user can easily identify an image displayed on display panel 210.

Pressure sensor 330 is embedded in main body case 310 to be coupled to a base end part of pen tip part 320. Pressure sensor 330 detects pressure applied to pen tip part 320 and sends the detection result to pen side microcomputer 360. Specifically, when a user writes a character or the like on display panel 210 with digital pen 300, pressure sensor 330 detects the pressure applied from display panel 210 to pen tip part 320. Pressure sensor 330 is used, for example, to determine whether the user has an intention to make an input by using digital pen 300.

Illuminator 380 is provided on a tip part of main body case 310 and at a vicinity of pen tip part 320. Illuminator 380 radiates non-visible light and is configured by, for example, infrared LED. Illuminator 380 is provided to radiate infrared light from the tip of main body case 310 when it is determined by the detection result of pressure sensor 330 that the user has an intention to make an input.

Objective lens 340 forms an image on image sensor 350 from light entering from the pen tip side. Objective lens 340 is provided on the tip part of main body case 310 and in the vicinity of pen tip part 320. When infrared light is radiated from illuminator 380 with the tip of digital pen 300 being directed to the display surface of display 200, the infrared light is transmitted through display panel 210 and is diffused and reflected by infrared reflection sheet 430, liquid crystal panel 450 located on a rear side of display panel 210, and the like. As a result, a part of the infrared light having transmitted through display panel 210 returns to the side of digital pen 300. The infrared light which is emitted from illuminator 380 and is diffused and reflected by display 200 enters into objective lens 340. Image sensor 350 is provided on an optical axis of objective lens 340. With this arrangement, the infrared light having passed through objective lens 340 forms an image on an imaging surface of image sensor 350.

Image sensor 350 outputs an image signal, which is an electric signal generated by converting the optical image formed on the imaging surface, to pen side microcomputer 360. Image sensor 350 is configured by, for example, a CCD image sensor or a CMOS image sensor. The details will be described later, but dots 411 forming the dot patterns are made of material (material having low transmittance for infrared light) which absorbs infrared light. Therefore, infrared light hardly returns through dots 411 forming the dot patterns to digital pen 300. On the other hand, more infrared light returns through the areas between dots 411 than through the areas of dots 411. As a result, an optical image, in which a dot pattern is expressed in black, is imaged by image sensor 350.

Pen side microcomputer 360 identifies the information of the position of digital pen 300 on display panel 210, based on the image signal which is generated by image sensor 350 by way of imaging. In detail, pen side microcomputer 360 obtains a pattern shape of the dot pattern from the image signal which is generated by image sensor 350 by imaging, and pen side microcomputer 360 identifies the position of pen tip part 320 on display panel 210, based on the pattern shape.

Pen side memory 390 stores a program to cause the CPU of pen side microcomputer 360 to operate. Pen side microcomputer 360 can appropriately read and write information from and in pen side memory 390.

Transmission unit 370 sends a signal to outside. Specifically, transmission unit 370 sends the position information identified by pen side microcomputer 360 to receiver 230 of display 200, which is a wireless communication partner.

[2. Details of Dot Pattern]

Figure 5A:
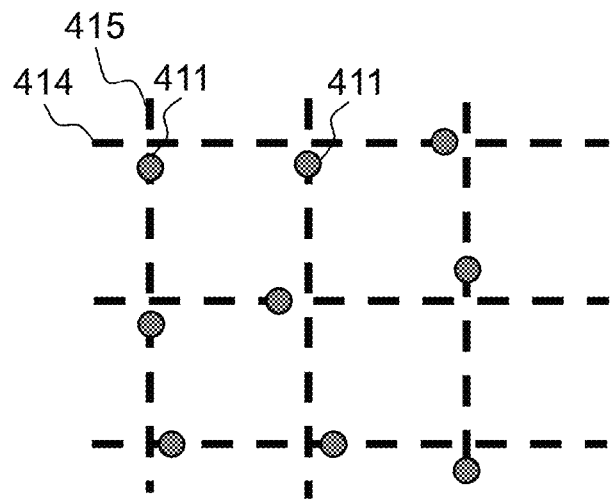
FIG. 5A is an enlarged image diagram for illustrating a dot pattern.
Figure 5B:
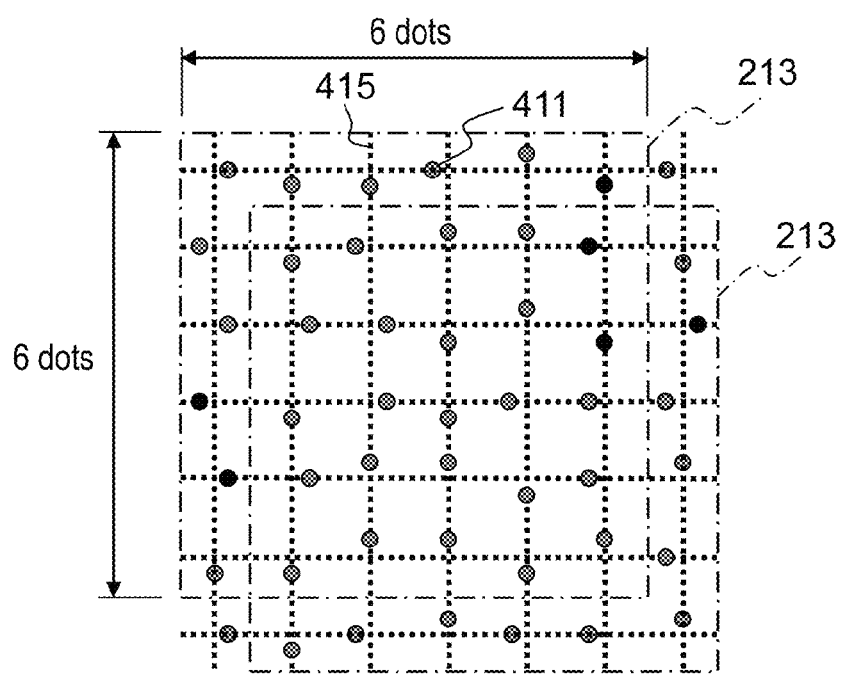
FIG. 5B is an enlarged image diagram for illustrating the dot patterns.
Figure 6A:
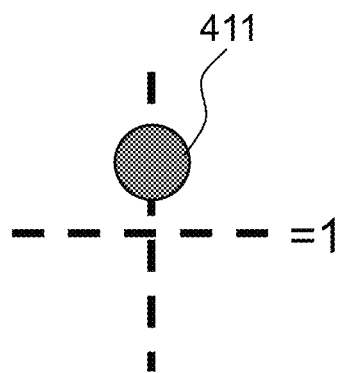
FIG. 6A is a schematic diagram for illustrating that numerical information of a position of a dot depends on the position of the dot.
Figure 6B:
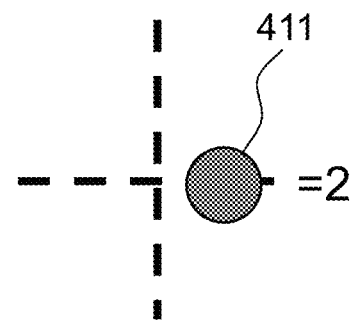
FIG. 6B is a schematic diagram for illustrating that numerical information of a position of a dot depends on the position of the dot.
Figure 6C:
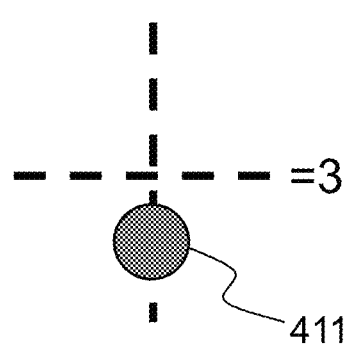
FIG. 6C is a schematic diagram for illustrating that numerical information of a position of a dot depends on the position of the dot.
Figure 6D:
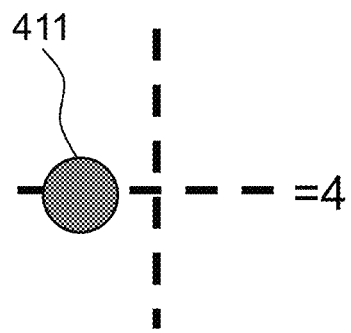
FIG. 6D is a schematic diagram for illustrating that numerical information of a position of a dot depends on the position of the dot.

In the following, the dot pattern will be described in detail. FIG. 5A and FIG. 5B are enlarged image diagrams for illustrating the dot pattern.

With reference to FIG. 5A, first reference lines 414 and second reference lines 415 on optical film 400a are described as virtual lines (the lines not actually existing on optical film 400a) in order to describe the positions of dots 411 of the dot pattern. First reference lines 414 and second reference lines 415 are mutually orthogonal. In FIG. 5A, the plurality of first reference lines 414 and the plurality of second reference lines 415 form a lattice.

Dots 411 are disposed in the vicinities of intersections between first reference lines 414 and second reference lines 415. In other words, each dot 411 is disposed in the vicinity of each lattice point. FIG. 6A, FIG. 6B, FIG. 6C, and FIG. 6D are diagrams showing patterns of disposition of dots 411. The extending direction of first reference line 414 is an X direction, and the extending direction of second reference line 415 is a Y direction, and dots 411 are disposed at positions which are offset (shifted) in a positive side or a negative side in the X direction or the Y direction from the intersection of first reference line 414 and second reference line 415. Specifically, on optical film 400a, each of dots 411 is disposed at any of the positions of FIG. 6A to FIG. 6D. According to the disposition shown in FIG. 6A, dot 411 is disposed on the upper side position of the intersection between first reference line 414 and second reference line 415. This disposition is represented by a numerical value "1". According to the disposition shown in FIG. 6B, dot 411 is disposed on the right side position of the intersection between first reference line 414 and second reference line 415. This disposition is represented by a numerical value "2". According to the disposition shown in FIG. 6C, dot 411 is disposed on the lower side position of the intersection between first reference line 414 and second reference line 415. This disposition is represented by a numerical value "3". According to the disposition shown in FIG. 6D, dot 411 is disposed on the left side position of the intersection between first reference line 414 and second reference line 415. This disposition is represented by a numerical value "4". As described above, dot 411 is represented by any one of the numerical values "1" to "4" on digital pen 300, depending on the disposition pattern.

Then, as shown in FIG. 5B, a set of 6 dots×6 dots is defined as one unit area 213, and thirty six dots 411 contained in unit area 213 form one dot pattern. By disposing each of thirty six dots 411 contained in unit area 213 with any one of the dispositions shown in FIG. 6A to FIG. 6D, it is possible to form enormous number (4 to the 36th power when the set of 6 dots×6 dots constitute one unit area) of dot patterns each of which has different information from each other. Depending on an interval between dots, coordinates of a vast plane, for example, 60 million $km^2$ can be defined by the dot patterns. Each of the dot patterns defining coordinates in this vast plane is in a different dot pattern from each other. For optical film 400a, only a part of the vast plane defined by the dot patterns is cut out to be used.

To every single dot pattern on optical film 400a, information about the position coordinates of each unit area is added. That is, when optical film 400a is divided into unit areas 213 of 6 dots×6 dots, each dot pattern represents the position coordinates of each unit area 213. The disposing order of offsetting (shifting) dots 411 along the X direction or the Y direction is designed based on a previously designed numerical sequence such as an M sequence, and dots 411 are continuously arranged in the X and Y directions in a certain rule. If some dot 411 in a unit area cannot be read, a hamming distance or the like is calculated with reference to the dots in a periphery of the unit area. By determining similarity between the result of this calculation and the numerical sequence as the designed values, even if several dots 411 could not be read, the offset (shifted) directions of those dots 411, which could not be read, can be estimated. However, there is limitation in the estimation, and it is preferable that all dots 411 in the unit area can be read if possible. Note that a known method can be used as the above methods for patterning (coding) and coordinate conversion (decoding) of the dot pattern.

Figure 7:
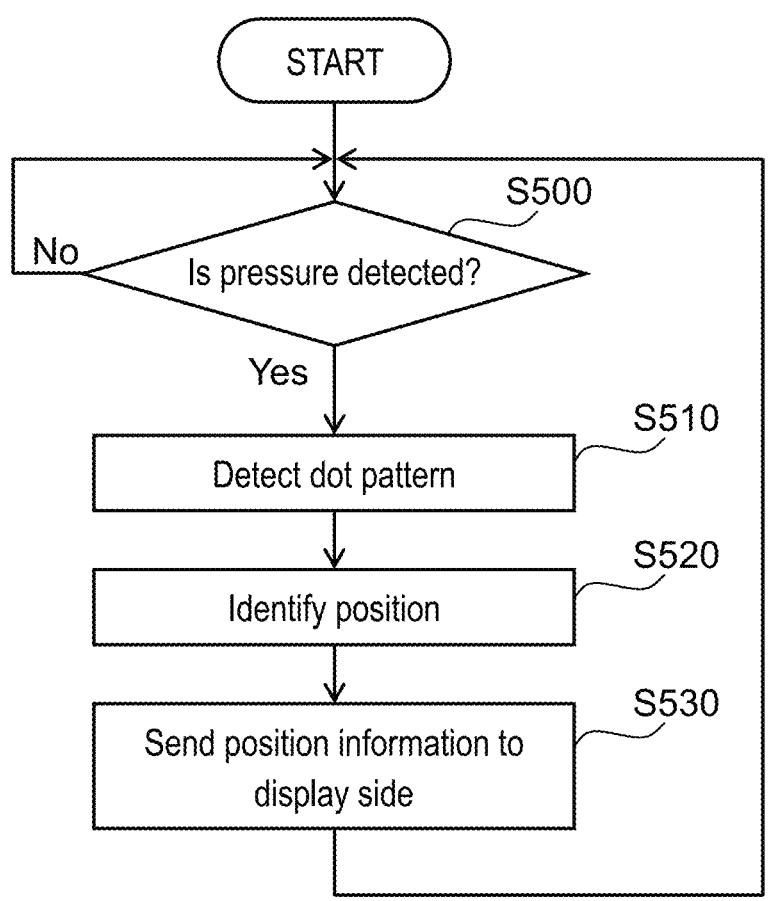
FIG. 7 is a flowchart showing an operation of the display control system.

Next, a display operation of display control system 100 configured as above will be described. FIG. 7 is a flowchart showing a flow of the display operation. In the following, description will be made on a case where a user performs pen input of (writes) a character on display 200 by using digital pen 300.

First, power sources of display 200 and digital pen 300 constituting display control system 100 are turned on. This allows display side microcomputer 240 to be supplied with power from the power source (not shown) and to complete an initial operation for executing various types of operations. In a similar manner, pen side microcomputer 360 is supplied with power from the power source (not shown) and completes an initial operation for executing various types of operations. Display 200 and digital pen 300 establish wireless communication with each other. This allows transmission unit 370 of digital pen 300 to communicate with receiver 230 of display 200.

Subsequently, pen side microcomputer 360 of digital pen 300 starts to monitor pressure applied to pen tip part 320 (step S500). The pressure is detected by pressure sensor 330. While the pressure is not detected by pressure sensor 330 (while "No" is kept at step S500), pen side microcomputer 360 repeats step S500. If pressure sensor 330 detects the pressure (step S500: Yes), pen side microcomputer 360 determines that the user is performing pen-input of a character or the like on display panel 210 of display 200, and causes illuminator 380 to start to radiate infrared light.

Next, objective lens 340 and image sensor 350 detect the dot pattern formed on display panel 210 at a position of the pen tip (step S510). Here, the infrared light emitted from illuminator 380 is diffused and reflected by infrared reflection sheet 430 or liquid crystal panel 450, and a part of the infrared light returns to digital pen 300 side.

The infrared light returning to digital pen 300 side is hardly transmitted through dots 411 of the dot pattern. Mainly, the infrared light, which is transmitted through the area between dots 411, reaches objective lens 340. Then, the infrared light is received by image sensor 350 through objective lens 340. Objective lens 340 is disposed so as to receive the reflected light from the position, on display panel 210, pointed by pen tip part 320. As a result, the dot pattern at the position, on the display surface of display panel 210, pointed by pen tip part 320 is imaged by image sensor 350. As described above, objective lens 340 and image sensor 350 optically read the dot pattern. The image signal generated by the imaging by image sensor 350 is sent to pen side microcomputer 360.

Next, pen side microcomputer 360 obtains the pattern shape of the dot pattern from the received image signal; and based on the pattern shape, pen side microcomputer 360 identifies the position of the pen tip on display panel 210 (step S520). In detail, pen side microcomputer 360 obtains the pattern shape of the dot pattern by performing a predetermined image processing on the image signal. Subsequently, pen side microcomputer 360 identifies, from the arrangement of dots 411 of the obtained pattern shape, which unit area (unit area of 6 dots×6 dots) the pattern represents; and pen side microcomputer 360 identifies the position coordinates (position information) of the unit area from the dot pattern of the unit area. Pen side microcomputer 360 converts the dot pattern into the position coordinates, by a predetermined calculation corresponding to a coding method of the dot pattern.

Then, pen side microcomputer 360 sends the identified position information to display 200 via transmission unit 370 (step S530). With this operation, display 200 can obtain the position of the pen tip of digital pen 300.

The position information sent from digital pen 300 is received by receiver 230 of display 200. The received position information is sent from receiver 230 to display side microcomputer 240.

Upon receiving the position information, display side microcomputer 240 executes, on display panel 210, a display operation corresponding to the display surface. Specifically, display side microcomputer 240 controls display panel 210 so as to change a display content at the position, in the display area of display panel 210, corresponding to the position information. In this example, because a character is input, display side microcomputer 240 displays a dot at the position, in the display area of display panel 210, corresponding to the position information. If the pen-input by digital pen 300 is continued, display side microcomputer 240 continues to obtain the position information. With this operation, display side microcomputer 240 can follow the movement of pen tip part 320 of digital pen 300, and can thus display the dots continuously at the positions of pen tip part 320 on the display area on display panel 210. In other words, display side microcomputer 240 can display, on display panel 210, the character corresponding to the path of pen tip part 320 of digital pen 300.

In the above, the description is made on a case where a character is written on the display surface; however, display control system 100 is not used only in such a way. It is a matter of course that digital pen 300 can be used not only to writing characters (numerals and the like) but also to write symbols, figures, or the like; however, digital pen 300 can also be used like an eraser to erase a character, a figure, or the like displayed on display panel 210. Further, digital pen 300 can also be used like a mouse to move a cursor displayed on display panel 210 or to select an icon displayed on display panel 210. That is, digital pen 300 can be used to operate a graphical user interface (GUI).

[3. Experimental Results]

There will be described measurement results of reflection intensity of the infrared light with respect to display panel 210 according to the first exemplary embodiment formed in the above configuration.

Figure 8:
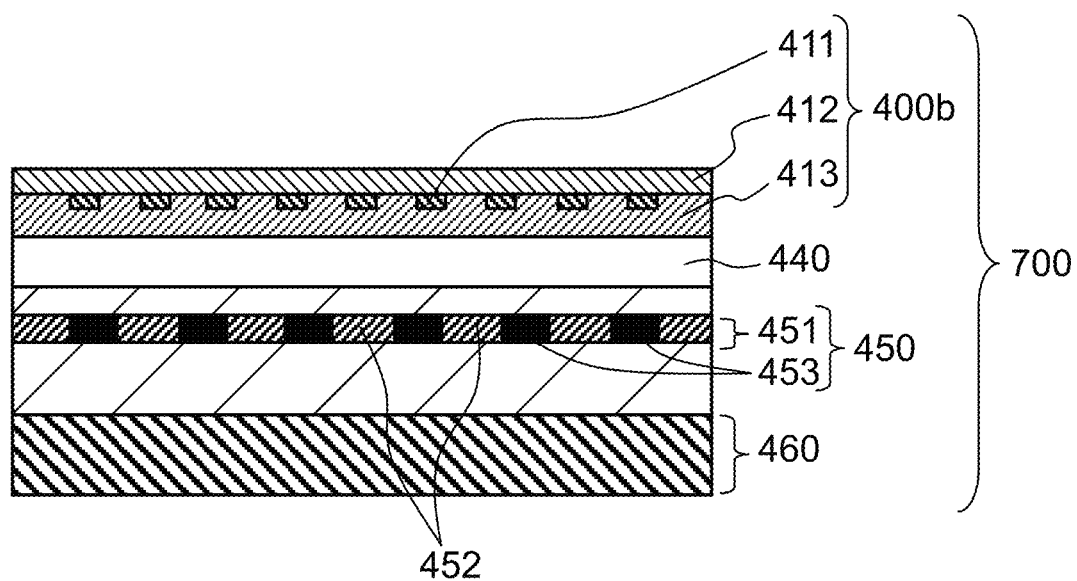
FIG. 8 is a sectional view of a display panel according to a comparative example.

Here, for comparison with display panel 210 according to the first exemplary embodiment, display panel 700 as shown in FIG. 8 was made. FIG. 8 shows a sectional view of display panel 700 according to the comparative example. As shown in FIG. 8, display panel 700 according to the comparative example is a panel made by removing infrared reflection sheet 430 from display panel 210 according to the first exemplary embodiment.

Note that digital pen 300 is configured by using, as LED 150, an infrared light emitting LED having a peak wavelength of 950 nm.

Next, there will be described how to measure diffuse-reflection characteristics of display panel 210 according to the first exemplary embodiment and display panel 700 according to the comparative example, which are formed as described above. The diffuse-reflection characteristics were measured in such a manner that, by using diffuse-reflection measurement device 500 as shown in FIG. 9, light is radiated from a certain angle and that only the light returning to the entering direction is received and measured.

Figure 9:
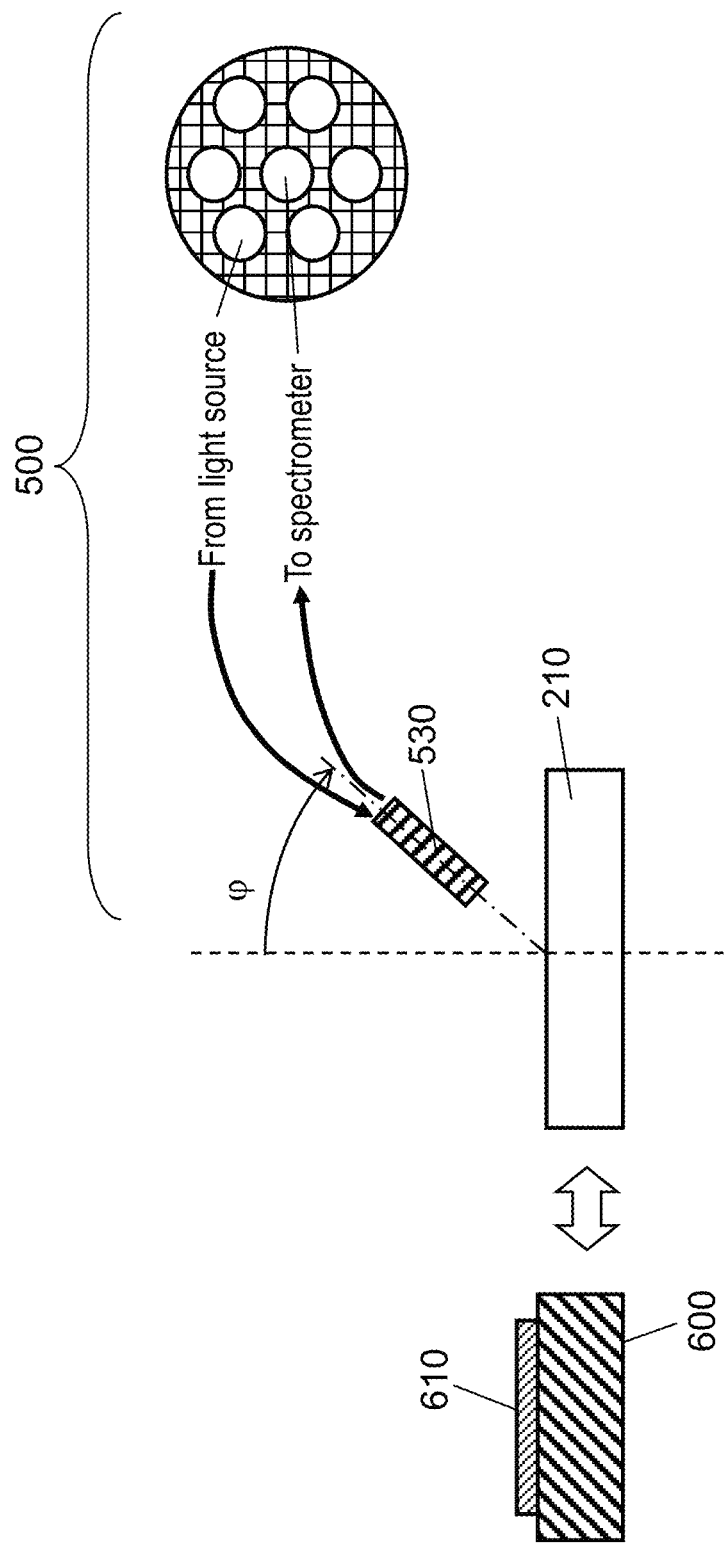
FIG. 9 is an image diagram showing a configuration of a device for measuring reflection characteristics of a display panel.

FIG. 9 is an image diagram of a configuration of a device for measuring reflection characteristics of display panel 210. As shown in FIG. 9, diffuse-reflection measurement device 500 includes a light source and a spectrometer (both not shown) and probe 530. The light source applies light including light in a range from a visible light region to an infrared light region. The light applied from the light source enters a sample (display panel 210, 700) through probe 530. Probe 530 includes seven optical fibers, the central optical fiber is coupled to the spectrometer, and the six optical fibers in the peripheral area are coupled to the light source. Probe 530 applies the light to the sample (display panel 210, 700) while inclining the light by a measurement angle φ (an angle corresponding to an inclination angle φ of digital pen 300) from a normal line of the surface of the sample (display panel 210, 700). The sample (display panel 210, 700) reflects a part of the light applied from probe 530 in a direction of probe 530. The reflected light is guided to the spectrometer through probe 530. In this way, the spectrometer conducts spectroscopic measurements. Note that, as a reference for the spectroscopic measurement, there is used standard reflection plate 600 as shown in FIG. 9, on which surface perfect diffusion surface 610 is stacked. Then, by calculating a ratio of the light intensity obtained by diffuse-reflection measurement device 500 to the measurement result of the light intensity with standard reflection plate 600, the reflection intensity ratio of display 200 normalized by the standard reflection plate is obtained.

Figure 10:
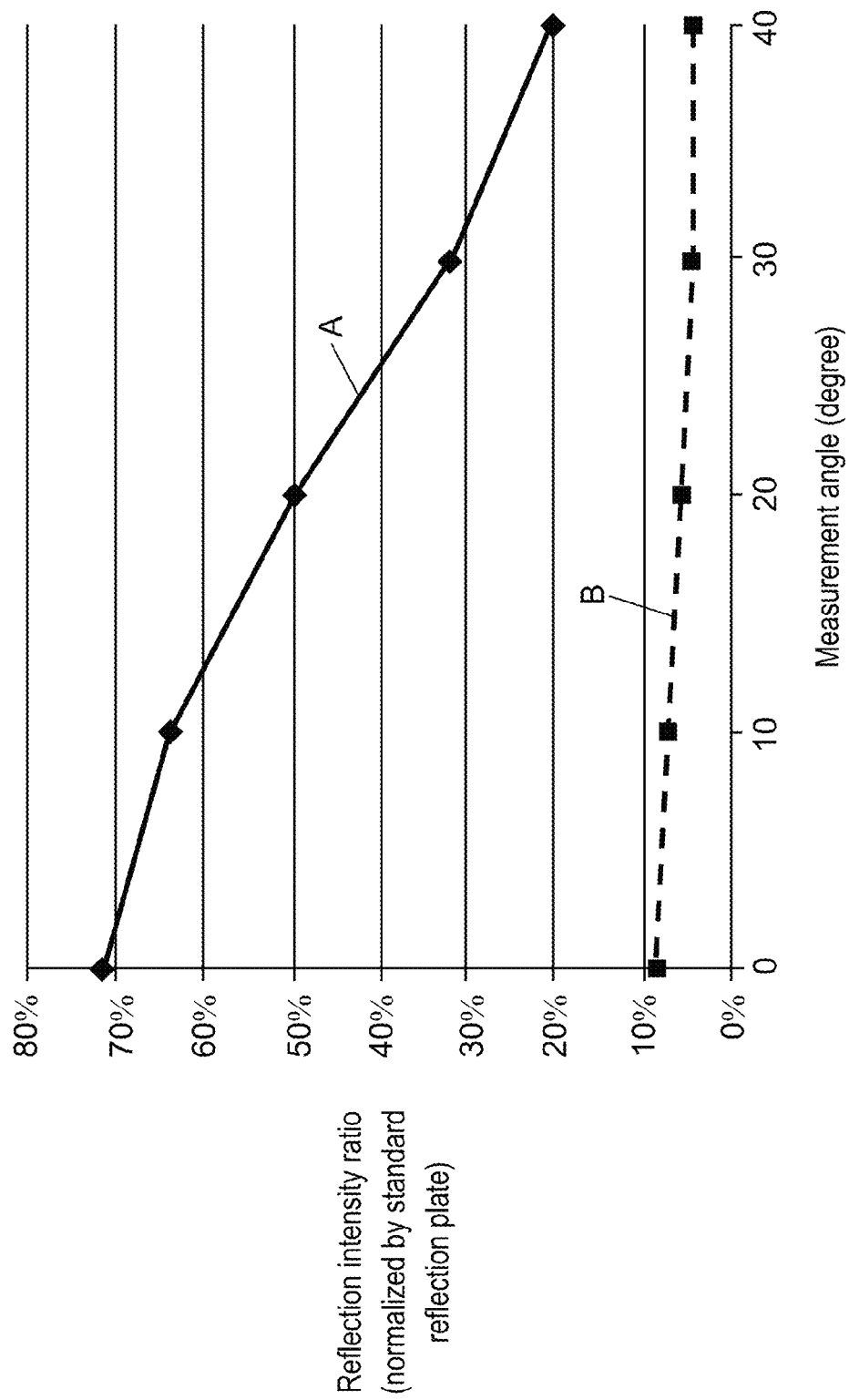
FIG. 10 is a diagram showing measurement results (normalized by a standard reflection plate) of a reflection intensity ratio between the display panel according to the first exemplary embodiment and the display panel according to the comparative example.

FIG. 10 is a diagram showing the measurement results (normalized by standard reflection plate 600) of the reflection intensity ratios with respect to display panel 210 according to the first exemplary embodiment and display panel 700 according to the comparative example. More specifically, the reflection intensity ratios for measurement angles (0° to 40°) at the wavelength of 950 nm are represented by the solid line and the broken line. Here, solid line A in FIG. 10 represents the reflection intensity ratio of display panel 210 according to the first exemplary embodiment. On the other hand, broken line B in FIG. 10 represents the reflection intensity ratio of display panel 700 according to the comparative example. As shown in FIG. 10, in the entire region of the measurement angle (0° to 40°), display panel 210 according to the first exemplary embodiment has higher reflectance than display panel 700 according to the comparative example. This is because the reflected light from infrared reflection sheet 430 disposed between dot pattern sheet 410 and color filter layer 451 greatly affects display panel 210 according to the first exemplary embodiment.

Next, with respect to these samples (display panels 210, 700), a reading test of the position information pattern was conducted by using digital pen 300. Specifically, image sensor 350 for detecting an infrared ray embedded in digital pen 300 was used to image the position information patterns of these samples (display panels 210, 700). At this time, the measurement angle of digital pen 300 was 40°. The results of the imaging are shown in FIG. 11A and FIG. 11B.

Figure 11B:
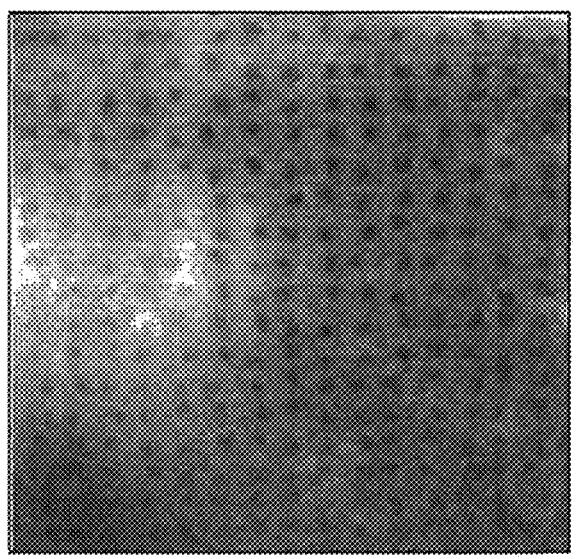
FIG. 11B is an explanatory diagram showing dot patterns and a pixel structure, imaged by the digital pen, of the display panel according to the comparative example.
Figure 11A:
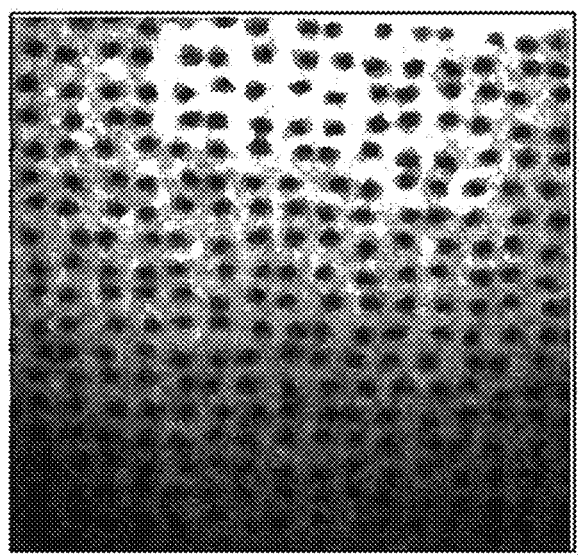
FIG. 11A is an explanatory diagram showing dot patterns and a pixel structure, imaged by a digital pen, of the display panel according to the first exemplary embodiment.

FIG. 11A and FIG. 11B are explanatory diagrams showing the dot patterns and the pixel structures imaged by digital pen 300 with respect to display panel 210 according to the first exemplary embodiment and display panel 700 according to the comparative example.

FIG. 11A is an image of display panel 210 according to the first exemplary embodiment captured by digital pen 300. FIG. 11B is an image of display panel 700 according to the comparative example captured by digital pen 300. With reference to FIG. 11A and FIG. 11B, a group of a plurality of black dots are dot patterns formed by dots 411.

As shown in FIG. 11B, in the image in which display panel 700 according to the comparative example is imaged, there are dot patterns and there is superimposed a shadow of the lattice structure (pixel structure) due to black matrix 453 disposed on color filter layer 451. In addition, the dot patterns have low contrast. This is because digital pen 300 receives the light including the dot pattern image, due to the reflected light having passed through black matrix 453 disposed on color filter layer 451. Even if the contrast of the dot pattern was low as described above or even if some dots 411 could not be read, it is possible to estimate offset (shift) directions of those dots 411 which could not be read. However, the contrast is even lower, the offsets of dots 411 cannot be estimated sufficiently, and the detection accuracy of the position information is accordingly lower.

On the other hand, as shown in FIG. 11A, in the image in which display panel 210 according to the first exemplary embodiment is imaged, there is superimposed no shadow of the lattice structure (pixel structure) of black matrix 453 disposed on color filter layer 451. In addition, the dot pattern has high contrast. This is because, in the light received by digital pen 300, the reflected light from infrared reflection sheet 430 is dominant rather than the reflected light from liquid crystal panel 450. With this arrangement, the reflected light from liquid crystal panel 450 is relatively weak; thus, the lattice structure (pixel structure) of black matrix 453 is less visible. This can secure the contrast of the dot pattern; thus, the detection accuracy of the position information can be improved.

Further, the images in FIG. 11A and FIG. 11B were used to perform decoding process to identify the position coordinates. At this time, in order to decode the image shown in FIG. 11B, it is necessary to perform at least an image processing process to remove the shadow of black matrix 453. On the other hand, in order to decode the image shown in FIG. 11A, it was not necessary to perform the image processing process to remove the shadow of black matrix 453; thus, the time required for the image processing was reduced by 10%. In addition, the number of effective dots to be used for the decoding process to identify the position coordinates is increased by 10%. As a result, even if display 200 is not clean, the number of effective detection dots is increased, and error correction is thus possible. Thus, even if some dots 411 could not be read, it is possible to accurately estimate the offset (shift) directions of those dots 411 which could not be read. As a result, an error frequency in reading dot patterns by digital pen 300 can be greatly lowered.

[4. Advantageous Effect and the Like]

As described above, display panel 210 according to the first exemplary embodiment is display panel 210 which constitutes display control system 100 together with digital pen 300. Digital pen 300 includes: illuminator 380 which emits infrared light; image sensor 350 which receives infrared light which is emitted from illuminator 380 and is reflected by display panel 210; and pen side microcomputer 360 which identifies position information, on display panel 210, pointed by digital pen 300, based on the infrared light received by image sensor 350. On the other hand, in order to identify the position information by digital pen 300, display panel 210 includes: dot pattern sheet 410 formed according to a predetermined rule; color filter layer 451 on which color filter 452 partitioned by black matrix 453 is disposed; and infrared reflection sheet 430 having optical characteristics that infrared light emitted from digital pen 300 is reflected. In addition, infrared reflection sheet 430 is disposed between dot pattern sheet 410 and color filter layer 451.

This arrangement prevents the image of position information pattern read by digital pen 300 from being superimposed with the shadow of the lattice structure due to black matrix 453; thus, the position coordinate can be more accurately decoded.

Further, infrared reflection sheet 430 has optical characteristics that infrared reflection sheet 430 provides a reflected light amount larger than the reflected light amount of the infrared light having transmitted through color filter layer 451 partitioned by black matrix 453. This arrangement allows the position coordinates to be decoded more accurately.

Further, the refractive index of dots 411 and the refractive index of dot planarization layer 413 are substantially the same, and the refractive index of transparent adhesive layer 431 and the refractive index of concavo-convex substrate 433 are substantially the same; therefore, the influence on display of liquid crystal panel 450 can be reduced.

As described above, the first exemplary embodiment is described as an example of the technique disclosed in the present application. However, the technique in the present disclosure is not limited thereto and can also be applied to an exemplary embodiment in which modification, replacement, addition, or removal is appropriately made.

Therefore, the components described in the accompanying drawings and in the detailed description can include not only components necessary to solve the problems but also components unnecessary to solve the problems. For this reason, it should not be immediately recognized that those unnecessary components are necessary, based on the fact that those unnecessary components are described in the accompanying drawings and the detailed description.

In addition, because the above exemplary embodiment is for exemplifying the technique in the present disclosure, various modifications, replacements, additions, or removals can be made without departing from the scope of the accompanying claims or the equivalent thereof.

The present disclosure can be applied to a display panel and to a reading device capable of constituting a display control system.

What is claimed is:

1. A display panel with which an optical pen can be used, the optical pen being configured to emit non-visible light and receive the non-visible light having been reflected, the display panel comprising:

a position information pattern layer having a pattern which causes the optical pen to identify a position on the display panel;

a color filter layer including a color filter partitioned by a lattice structure; and a non-visible light reflection layer having a shape which diffuses and reflects a part of the non-visible light emitted from the optical pen, wherein the non-visible light reflection layer is disposed between the position information pattern layer and the color filter layer, and an amount of light which is reflected by the non-visible light reflection layer and then enters the optical pen is larger than an amount of light which enters the optical pen through the non-visible light reflection layer after being transmitted through the color filter layer and then reflected.

2. The display panel according to claim 1, wherein the shape is a concavo-convex shape.

3. The display panel according to claim 1, wherein the non-visible light reflection layer has a substrate and a concavo-convex shaped reflection layer, and is laminated with the position information pattern layer with an adhesive layer interposed between the non-visible light reflection layer and the position information pattern layer, and a refractive index of the substrate is substantially equal to a refractive index of the adhesive layer.

4. The display panel according to claim 1, wherein the pattern absorbs an infrared ray.

5. A display control system comprising:
an optical pen; and
a display panel,
wherein the optical pen includes:
an emission part which emits non-visible light;
a light receiver which receives non-visible light; and
a coordinate identification unit which identifies, based on the non-visible light received by the light receiver, information of a position which is on the display panel and pointed by the optical pen, and
the display panel includes:
a position information pattern layer having a pattern which causes the optical pen to identify a position on the display panel;
a color filter layer including a color filter partitioned by a lattice structure; and
a non-visible light reflection layer having a shape which diffuses and reflects at least a part of the non-visible light emitted from the optical pen, the non-visible light reflection layer being disposed between the position information pattern layer and the color filter layer, and
an amount of light which is reflected by the non-visible light reflection layer and then enters the optical pen is larger than an amount of light which enters the optical pen through the non-visible light reflection layer after being transmitted through the color filter layer and then reflected.

* * * * *